(12) United States Patent
Luo et al.

(10) Patent No.: US 10,618,001 B2
(45) Date of Patent: Apr. 14, 2020

(54) DESULFURIZATION ABSORPTION TOWER

(71) Applicant: Jiangnan Environmental Protection Group Inc., Grand Cayman (KY)

(72) Inventors: Jing Luo, NanJing (CN); Congzhi Zhang, NanJing (CN); Yongying Luo, NanJing (CN)

(73) Assignee: Jiangnan Environmental Protection Group Inc., Grand Cayman (KY)

( * ) Notice: Subject to any disclaimer, the term of this patent is extended or adjusted under 35 U.S.C. 154(b) by 0 days.

(21) Appl. No.: 16/565,768

(22) Filed: Sep. 10, 2019

(65) Prior Publication Data

US 2020/0001235 A1 Jan. 2, 2020

Related U.S. Application Data

(62) Division of application No. 15/828,547, filed on Dec. 1, 2017, now Pat. No. 10,421,040.

(30) Foreign Application Priority Data

Jul. 3, 2017 (CN) .......................... 2017 1 0533738

(51) Int. Cl.
*B01D 53/50* (2006.01)
*B01D 53/76* (2006.01)
(Continued)

(52) U.S. Cl.
CPC ....... *B01D 53/8637* (2013.01); *B01D 53/504* (2013.01); *B01D 53/76* (2013.01);
(Continued)

(58) Field of Classification Search
CPC ................ B01D 53/8637; B01D 53/76; B01D 2252/10; B01D 2257/302; B01J 20/046; C01B 7/01; C01B 17/56; C10G 2300/207
See application file for complete search history.

(56) References Cited

U.S. PATENT DOCUMENTS 2,810,627 A 10/1957 Johnstone et al.
3,752,877 A 8/1973 Beavon
(Continued)

FOREIGN PATENT DOCUMENTS

CL 197600168 3/1976
CL 199400326 3/1994
(Continued)

OTHER PUBLICATIONS

Canadian Intellectual Property Office Examination Report, dated Oct. 9, 2018.
(Continued)

*Primary Examiner* — Cabrena Holecek
(74) *Attorney, Agent, or Firm* — Weiss & Arons LLP

(57) ABSTRACT

A desulfurization absorption tower, a method for setting up the same and a method for operating the same. The tower may include an internal anti-corrosion layer that may be used for contacting the flue gas and the desulfurization absorption liquid, may define the tower chamber, and may include stainless steel plate whose thickness is 1.0 mm to 6.0 mm. The tower body may include an external supporting layer that may be used for supporting the anti-corrosion layer and may include carbon steel. The supporting layer and the anti-corrosion layer may be designed to jointly bear a load, wherein the supporting layer may be designed to bear a large part of the load, and the anti-corrosion layer may be designed to bear a small part of the load.

30 Claims, 3 Drawing Sheets

(51) Int. Cl.
  *B01D 53/86* (2006.01)
  *B01J 20/04* (2006.01)
  *C01B 17/56* (2006.01)
  *C01B 7/01* (2006.01)

(52) U.S. Cl.
  CPC .............. *B01J 20/046* (2013.01); *C01B 7/01* (2013.01); *C01B 17/56* (2013.01); *B01D 2252/10* (2013.01); *B01D 2252/102* (2013.01); *B01D 2257/302* (2013.01); *C10G 2300/207* (2013.01)

(56) References Cited

U.S. PATENT DOCUMENTS

| | | |
|---|---|---|
| 3,983,217 A | 9/1976 | Muraki et al. |
| 4,294,590 A | 10/1981 | Linde et al. |
| 4,324,776 A | 4/1982 | Kim |
| 4,378,977 A | 4/1983 | Linde et al. |
| 4,552,747 A | 11/1985 | Goar |
| 4,690,807 A | 9/1987 | Saleem |
| 5,019,361 A | 5/1991 | Hakka |
| 5,106,607 A | 4/1992 | Chopin et al. |
| 5,632,967 A | 5/1997 | Nasato |
| 6,063,352 A | 5/2000 | Risse et al. |
| 6,066,304 A | 5/2000 | Freetly et al. |
| 6,139,807 A | 10/2000 | Risse et al. |
| 6,444,185 B1 | 9/2002 | Nougayrede et al. |
| 6,508,998 B1 | 1/2003 | Nasato |
| 6,569,398 B2 | 5/2003 | Fenderson |
| 6,616,908 B2 | 9/2003 | Watson et al. |
| 6,776,974 B1 | 8/2004 | Burmaster et al. |
| 7,351,392 B2 | 4/2008 | Chen et al. |
| 7,635,408 B2 | 12/2009 | Mak et al. |
| 7,648,692 B2 | 1/2010 | Chow et al. |
| 7,754,471 B2 | 7/2010 | Chen et al. |
| 7,879,135 B2 | 2/2011 | Ravikumar et al. |
| 7,910,077 B2 | 3/2011 | Chow et al. |
| 8,178,070 B2 | 5/2012 | Wong et al. |
| 8,206,669 B2 | 6/2012 | Schaffer et al. |
| 8,361,432 B2 | 1/2013 | Parekh et al. |
| 8,444,943 B2 | 5/2013 | Lamar |
| 8,545,793 B2 | 10/2013 | Thielert |
| 8,871,176 B2 | 10/2014 | Liu et al. |
| 9,370,745 B2 | 6/2016 | Xu et al. |
| 2007/0248518 A1 | 10/2007 | Jung et al. |
| 2009/0004070 A1 | 1/2009 | Chow et al. |
| 2011/0195008 A1 | 8/2011 | Menzel et al. |
| 2011/0243822 A1 | 10/2011 | Mortson |
| 2015/0352489 A1 | 12/2015 | Luo et al. |
| 2017/0056822 A1* | 3/2017 | Woodward ............ B01D 53/502 |
| 2017/0173515 A1* | 6/2017 | Gesbert ............ B01D 53/0431 |

FOREIGN PATENT DOCUMENTS

| | | |
|---|---|---|
| CL | 199501217 | 8/1995 |
| CN | 2497858 Y | 7/2002 |
| CN | 1164480 C | 9/2004 |
| CN | 2640584 Y | 9/2004 |
| CN | 2640585 Y | 9/2004 |
| CN | 2668235 Y | 1/2005 |
| CN | 2746971 Y | 12/2005 |
| CN | 2746972 Y | 12/2005 |
| CN | 2746973 Y | 12/2005 |
| CN | 2754711 Y | 2/2006 |
| CN | 1251965 C | 4/2006 |
| CN | 2772609 Y | 4/2006 |
| CN | 2799059 Y | 7/2006 |
| CN | 2799060 Y | 7/2006 |
| CN | 1283346 C | 11/2006 |
| CN | 1321723 C | 6/2007 |
| CN | 101085410 A | 12/2007 |
| CN | 201030298 Y | 3/2008 |
| CN | 201052456 Y | 4/2008 |
| CN | 100395006 C | 6/2008 |
| CN | 201109711 Y | 9/2008 |
| CN | 100428979 C | 10/2008 |
| CN | 201129965 Y | 10/2008 |
| CN | 201132102 Y | 10/2008 |
| CN | 201179415 Y | 1/2009 |
| CN | 100460045 C | 2/2009 |
| CN | 201208543 | 3/2009 |
| CN | 201208545 Y | 3/2009 |
| CN | 100475313 C | 4/2009 |
| CN | 101422693 A | 5/2009 |
| CN | 201231130 Y | 5/2009 |
| CN | 201320447 Y | 10/2009 |
| CN | 201333376 Y | 10/2009 |
| CN | 101575103 A | 11/2009 |
| CN | 101585511 A | 11/2009 |
| CN | 201380037 Y | 1/2010 |
| CN | 201380038 Y | 1/2010 |
| CN | 201380039 Y | 1/2010 |
| CN | 201380040 Y | 1/2010 |
| CN | 201381670 Y | 1/2010 |
| CN | 100588608 C | 2/2010 |
| CN | 101642629 A | 2/2010 |
| CN | 201423237 Y | 3/2010 |
| CN | 101274750 B | 6/2010 |
| CN | 201492952 U | 6/2010 |
| CN | 201529487 U | 7/2010 |
| CN | 201529488 U | 7/2010 |
| CN | 201537456 U | 8/2010 |
| CN | 101274196 B | 12/2010 |
| CN | 201959714 U | 12/2010 |
| CN | 201959715 U | 12/2010 |
| CN | 101182926 B | 1/2011 |
| CN | 101519192 B | 2/2011 |
| CN | 101579600 B | 4/2011 |
| CN | 102012034 A | 4/2011 |
| CN | 101456541 B | 5/2011 |
| CN | 101576261 B | 5/2011 |
| CN | 101579602 B | 5/2011 |
| CN | 102061206 A | 5/2011 |
| CN | 101274204 B | 6/2011 |
| CN | 101670231 B | 8/2011 |
| CN | 201912884 U | 8/2011 |
| CN | 201912885 U | 8/2011 |
| CN | 201944861 U | 8/2011 |
| CN | 201949808 U | 8/2011 |
| CN | 201959715 U | 9/2011 |
| CN | 102205202 A | 10/2011 |
| CN | 102380305 A | 3/2012 |
| CN | 102381685 A | 3/2012 |
| CN | 102381686 A | 3/2012 |
| CN | 101791517 B | 5/2012 |
| CN | 102451604 A | 5/2012 |
| CN | 101456540 B | 7/2012 |
| CN | 101574614 B | 7/2012 |
| CN | 101637685 B | 7/2012 |
| CN | 102631827 A | 8/2012 |
| CN | 202460375 U | 10/2012 |
| CN | 202460420 U | 10/2012 |
| CN | 202460438 U | 10/2012 |
| CN | 101530727 B | 11/2012 |
| CN | 101955828 B | 11/2012 |
| CN | 102211762 B | 11/2012 |
| CN | 101972592 B | 12/2012 |
| CN | 101934191 B | 1/2013 |
| CN | 102049186 B | 1/2013 |
| CN | 203090733 U | 1/2013 |
| CN | 202751942 U | 2/2013 |
| CN | 202754802 U | 2/2013 |
| CN | 202829575 U | 3/2013 |
| CN | 101418246 B | 4/2013 |
| CN | 202912691 U | 5/2013 |
| CN | 202924730 U | 5/2013 |
| CN | 202953829 U | 5/2013 |
| CN | 203090733 U | 7/2013 |
| CN | 102381687 B | 8/2013 |
| CN | 203159221 U | 8/2013 |
| CN | 203264545 U | 11/2013 |
| CN | 203291675 U | 11/2013 |
| CN | 203556262 U | 11/2013 |

(56) References Cited

FOREIGN PATENT DOCUMENTS

| | | |
|---|---|---|
| CN | 102489140 B | 12/2013 |
| CN | 103418223 A | 12/2013 |
| CN | 203329558 U | 12/2013 |
| CN | 203612955 U | 5/2014 |
| CN | 102942162 B | 8/2014 |
| CN | 203781842 U | 8/2014 |
| CN | 102910593 B | 9/2014 |
| CN | 102847431 B | 10/2014 |
| CN | 103204477 B | 10/2014 |
| CN | 103446859 B | 10/2014 |
| CN | 104138713 A | 11/2014 |
| CN | 103301732 B | 1/2015 |
| CN | 103041679 B | 2/2015 |
| CN | 103301736 B | 2/2015 |
| CN | 104368231 A | 2/2015 |
| CN | 204134465 U | 2/2015 |
| CN | 204151066 U | 2/2015 |
| CN | 102895870 B | 3/2015 |
| CN | 102923670 B | 3/2015 |
| CN | 204198421 U | 3/2015 |
| CN | 103223292 B | 4/2015 |
| CN | 104555939 A | 4/2015 |
| CN | 204233957 U | 4/2015 |
| CN | 103112831 B | 5/2015 |
| CN | 204352660 U | 5/2015 |
| CN | 103301705 B | 8/2015 |
| CN | 103482583 B | 9/2015 |
| CN | 104923046 A | 9/2015 |
| CN | 104927894 A | 9/2015 |
| CN | 104941423 A | 9/2015 |
| CN | 104946296 A | 9/2015 |
| CN | 103463949 B | 12/2015 |
| CN | 105110819 A | 12/2015 |
| CN | 105126573 A | 12/2015 |
| CN | 204816188 U | 12/2015 |
| CN | 104353258 B | 1/2016 |
| CN | 104249995 B | 4/2016 |
| CN | 205235588 U | 5/2016 |
| CN | 205245200 U | 5/2016 |
| CN | 205252720 U | 5/2016 |
| CN | 205252721 U | 5/2016 |
| CN | 205252722 U | 5/2016 |
| CN | 205262780 U | 5/2016 |
| CN | 103822217 B | 6/2016 |
| CN | 105757688 A | 7/2016 |
| CN | 104555940 B | 8/2016 |
| CN | 105841168 A | 8/2016 |
| CN | 104524948 B | 9/2016 |
| CN | 205549846 U | 9/2016 |
| CN | 205562498 U | 9/2016 |
| CN | 103521060 B | 1/2017 |
| CN | 103939918 B | 1/2017 |
| CN | 104208992 B | 2/2017 |
| CN | 104258713 B | 2/2017 |
| CN | 104528659 B | 4/2017 |
| DE | 3733319 A1 | 9/1989 |
| DE | 4332370 | 9/1994 |
| EP | 165609 B1 | 6/1985 |
| EP | 212523 A2 | 3/1987 |
| WO | WO200507505 A1 | 8/2005 |
| WO | WO2005113429 A1 | 12/2005 |
| WO | WO2006113935 A2 | 10/2006 |
| WO | WO2010150731 | 12/2010 |
| WO | WO2012152919 A1 | 11/2012 |

OTHER PUBLICATIONS

"Introduction to FGD for China Shenhua Coal to Liquid(CTL) Project," Jiangnan Environmental Technology, Inc., 19$^{th}$ Annual Electric Power Conference and Exhibition, Apr. 13, 2017, Chicago, Illinois.

"Advantages & Application of Efficient Ammonia-Based Desulfurization Technology," Jiangnan Environmental Technology, Inc., 19$^{th}$ Annual Electric Power Conference and Exhibition, Apr. 13, 2017, Chicago, Illinois.

Extended European Search Report issued in European Application No. 17197257.3, dated May 30, 2018.

International Search Report and Written Opinion of the International Searching Authority, dated Oct. 22, 2018.

Chilean Search Report for CL 2017-002697, dated Dec. 18, 2018, 11 pages.

Office Action issued in U.S. Appl. No. 14/829,905 dated Nov. 16, 2015.

Office Action issued in U.S. Appl. No. 14/829,905 dated Feb. 29, 2016.

Office Action issued in U.S. Appl. No. 14/829,909 dated Apr. 15, 2016.

Office Action issued in U.S. Appl. No. 14/829,909 dated Dec. 14, 2016.

Office Action issued in U.S. Appl. No. 14/829,909 dated Feb. 14, 2017.

International Search Report issued for International Application No. PCT/CN2013/074657, dated Dec. 26, 2013.

International Search Report issued for International Application No. PCT/CN2014/087887, dated Jan. 14, 2015.

Supplementary European Search Report issued in European Application No. 13882863.7, dated Mar. 11, 2016.

Google Patents English translation of CN1283346C.
Google Patents English translation of CN2640585Y.
Google Patents English translation of CN2772609Y.
Google Patents English translation of CN100428979C.
Google Patents English translation of CN201912885U.
Google Patents English translation of CN10322392A.

Examination Report issued by the European Patent Office, dated Jan. 29, 2019.

Office Action from the Brazilian Patent Office, dated May 30, 2019.

\* cited by examiner

DESULFURIZATION ABSORPTION TOWER

This application is a divisional of U.S. application Ser. No 15/828,547, filed on Dec. 1, 2017, which claims priority under 35 U.S.C. § 119 of Chinese Patent Application No. 201710533738.8, filed on Jul. 3, 2017, both of which are hereby incorporated herein in their entireties.

TECHNICAL FIELD

The disclosure relates to a desulfurization absorption tower, especially an ammonia-process desulfurization absorption tower, having an anti-corrosion structure. The disclosure relates to a setup method and an operating method of such a desulfurization absorption tower.

BACKGROUND

A desulfurization absorption tower, for example, an ammonia-process desulfurization absorption tower, is a reaction still for acid-base neutralization reactions. In the desulfurization absorption tower, flue gas containing acid substances, such as $SO_2$ and HCl, and alkaline substances, such as those in absorption liquid, flow in opposite directions, and acid-base neutralization reactions occur, and produce salts, when the flue gas and the alkaline substances contact each other. When the concentration of the resulting salt solution in the tower chamber rises sufficiently, crystal particles may be precipitated from the salt solution. The acid substances, the alkaline substances, the salt solution and the crystal particles may corrode and abrade the tower body.

Glass flakes or rubbers are widely used in the desulfurization absorption tower as an anti-corrosion lining of the tower. Because the environment in the tower chamber is corrosive during operation of the desulfurization absorption tower, the desulfurization absorption tower lined with glass flakes or rubbers has a short continuous operating cycle and a short service life. According to long-term use experience worldwide, the service life of the tower body ranges from 5 years to 10 years, the anti-corrosion lining needs to be replaced once every 3 to 5 years, and the daily maintenance workload is large. In addition, raw materials and adjuvants of such a desulfurization absorption tower are flammable, volatile and toxic. Therefore, the construction environment is bad, and there is a risk of fire during construction.

A patent document CN201288543Y discloses a desulfurization absorption tower with a reinforced concrete structure, of which the tower body includes an internal anti-corrosion lining and an external reinforced concrete layer connected to the anti-corrosion lining. The anti-corrosion lining is an anti-corrosion plate made of a polymer material, and the anti-corrosion plate is cast together with the reinforced concrete layer and is fixed through an anchor cast in the reinforced concrete layer. In such a desulfurization absorption tower, the anti-corrosion lining is prone to damage, and it is difficult to timely find the damage to the anti-corrosion lining. As the desulfurization absorption liquid may enter into the reinforced concrete to corrode the reinforced concrete after the anti-corrosion lining is damaged, the tower body is prone to damage. Such a desulfurization absorption tower has a short continuous operating cycle and a short service life, the materials are flammable and toxic, and repair is difficult when the desulfurization absorption tower is damaged. A patent document CN20120854SY also discloses a similar desulfurization absorption tower, and the technical features thereof are similar.

A patent document CN203090733U discloses a desulfurization absorption tower, which includes a tower body made of glass fiber reinforced plastics. A wear-resistant layer is disposed on an inner surface at the bottom of the tower body, to enhance the wear-resistant property of the inner surface at the bottom. It is difficult to ensure the strength of such a desulfurization absorption tower, and less flue gas is treated than other towers of equal size. When the amount of flue gas to be treated is over 500,000 $Nm^3/h$, the diameter of the desulfurization absorption tower made of glass fiber reinforced plastics is more than 9 m, but a tower of glass fiber reinforced plastics with a large tower diameter has a risk of overall collapse.

A patent document CN201959715U discloses a desulfurization absorption tower made of stainless steel and used for treating sintering machine flue gas, wherein the whole tower body is made of a stainless steel material. Such a desulfurization absorption tower has defects such as a high investment cost, a great construction difficulty, and difficulty in meeting requirements of different working conditions.

A patent document CN204816188U also discloses a desulfurization absorption tower, of which the tower body is formed by stainless steel plates welded together. Such a desulfurization absorption tower also has a high investment cost, a great construction difficulty, and difficulty in meeting requirements of different working conditions.

BRIEF DESCRIPTION OF THE DRAWINGS

The present invention is explained exemplarily in detail below by means of embodiments and with reference to the accompanying drawings. The embodiments do not limit the present invention, but are used to better understand the present invention. Schematic accompanying drawings are described briefly as follows.

DETAILED DESCRIPTION

Figure 1:
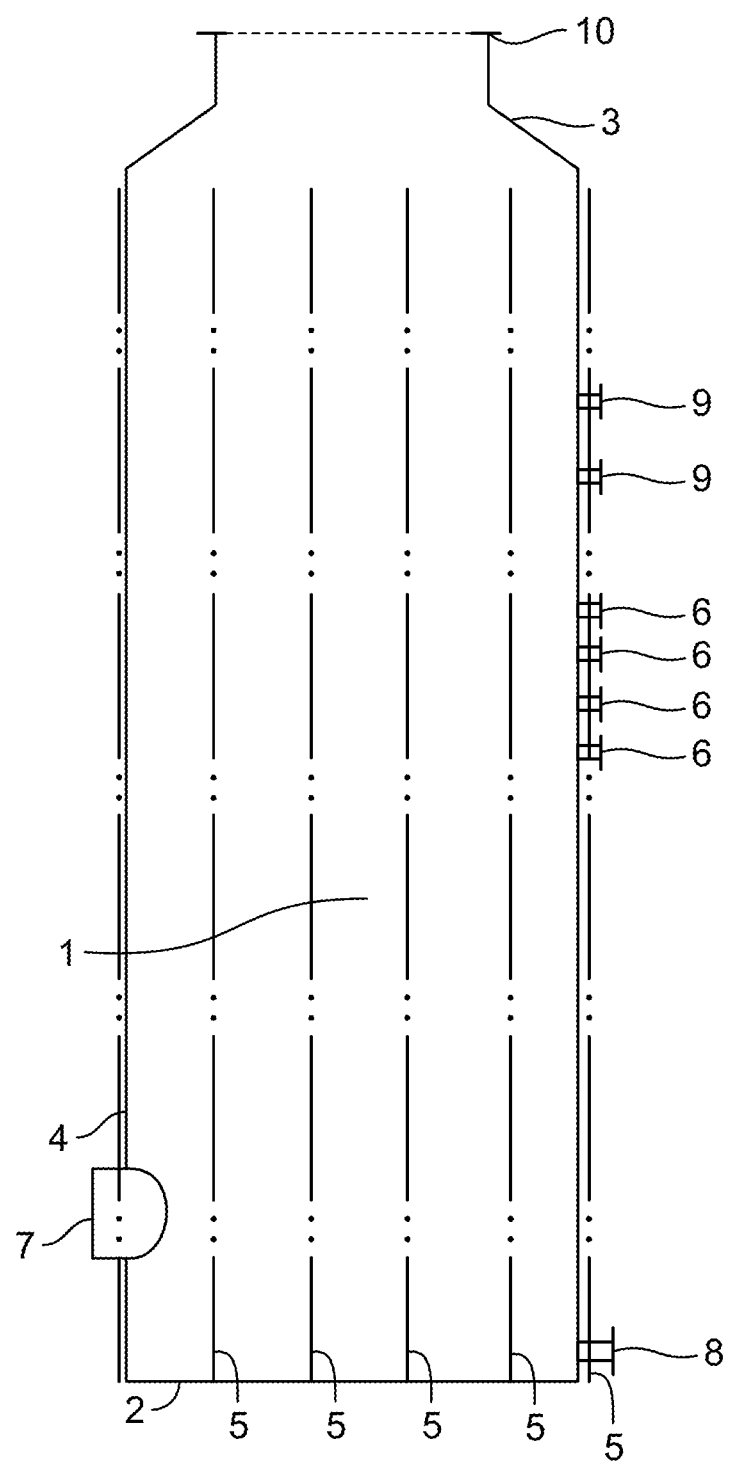
FIG. 1 is a schematic front view of an embodiment of a desulfurization absorption tower in accordance with the principles of the invention.

Apparatus and methods for flue-gas desulfurization are provided. The apparatus may include, and the methods may involve, an anti-corrosion layer. The anti-corrosion layer may include stainless steel plate. The stainless steel plate may include steel that has been cast, rolled, extruded, or otherwise fabricated. The stainless steel plate may include sheet metal, plate metal, or metal in any other suitable form. The stainless steel plate may be monolithic or may include one or more stainless steel plate elements. The elements may be joined by welds, mechanical fasteners, such as bolts, or by any other suitable method. The elements may be braced to a frame. The elements may be braced to one or more other stainless steel elements.

The stainless steel plate may be configured to contact the flue gas. The stainless steel plate may be configured to contact a desulfurization absorption liquid, the plate having a mass that has a gravitational load.

The apparatus may include a supporting layer. The supporting layer may include a carbon steel support. The carbon steel support may be configured to support the plate. The stainless steel plate and the carbon steel support jointly support the load.

The carbon steel support may bear more of the load than does the steel plate.

The stainless steel plate may have a thickness in the range 1.0 mm to 6.0 mm.

The plate thickness may be about 1 mm.
The plate thickness may be about 1.5 mm.
The plate thickness may be about 2.0 mm.
The plate thickness may be about 2.5 mm.
The plate thickness may be about 3.0 mm.
The plate thickness may be about 3.5 mm.
The plate thickness may be about 4.0 mm.
The plate thickness may be about 4.5 mm.
The plate thickness may be about 5.0 mm.
The plate thickness may be about 5.5 mm.
The plate thickness may be about 6.0 mm.
Table 1 shows illustrative plate thickness ranges.

TABLE 1

Illustrative plate thicknesses and ranges.
Thickness, limits inclusive, mm (lower limit only where no upper limit is given)

| Illustrative Approximate Thickness | Lower | Upper |
|---|---|---|
| 1 | 0.6 | 1.5 |
| 1.5 | 1 | 2 |
| 2 | 1.5 | 2.5 |
| 2.5 | 2 | 3 |
| 3 | 2.5 | 3.5 |
| 3.5 | 3 | 4 |
| 4 | 3.5 | 4.5 |
| 4.5 | 4 | 5 |
| 5 | 4.5 | 5.5 |
| 5.5 | 5 | 6 |
| 6 | 5.5 | — |

The steel plate may include a plurality of steel plates. The steel plates may be arranged as an interior layer of a tower.

The steel plate may be included in the interior layer of a tower. The tower may be configured to apply to the flue gas: a first desulfurization absorption liquid having, after application to the flue gas, a first chloride ion concentration; and a second desulfurization absorption liquid having, after application to the flue gas, a second chloride ion concentration that is different from the first chloride ion concentration.

The steel plate may include: a first composition; and a second composition. The steel plate may define a flue gas guide path. The guide path may be arranged such that the steel plate contacts the first liquid with the first composition; and the second liquid with the second composition.

One of the first and second compositions may be used in connection with a liquid having a chloride ion concentration that is less than 10,000 mg/L. The other of the first and second compositions may be used with a liquid having a chloride ion concentration that is in the range 10,000 to 20,000 mg/L.

The composition that corresponds to the chloride ion concentration that is less than 10,000 mg/L may be 316L stainless steel.

The composition that corresponds to a chloride ion concentration that is in the range 10,000 to 20,000 mg/L may be 2205 stainless steel or 2605N stainless steel.

One of the first and second compositions may be used in connection with a liquid that has a chloride ion concentration that is less than 10000 mg/L. The other of the first and second compositions may be used in connection with a liquid that has a chloride ion concentration that is no less than 20,000 mg/L.

The composition that corresponds to the chloride ion concentration that is less than 10,000 mg/L may be 316L stainless steel.

The composition that corresponds to the chloride ion concentration that is no less than 20,000 mg/L may be 2507 stainless steel.

One of the first and second compositions may be used in connection with a liquid that has a chloride ion concentration that is in the range 10,000 to 20,000 mg/L. The other of the first and second compositions may be used in connection with a liquid that has a chloride ion concentration that is no less than 20,000 mg/L.

The composition that corresponds to the chloride ion concentration that is in the range 10,000 to 20,000 mg/L may be 2205 stainless steel or 2605N stainless steel.

The composition that corresponds to the chloride ion concentration that is no less than 20,000 mg/L may be 2507 stainless steel.

The steel plate may include a first section including 316L stainless steel. The steel plate may include a second section including 2205 stainless steel or 2605N stainless steel. The steel plate may include a third section including 2507 stainless steel.

The plate may define a flue gas guide path along which: the first section is configured to channel desulfurization absorption liquid having a chloride ion concentration that is less than 10,000 mg/L; the second section is configured to channel desulfurization absorption liquid having a chloride ion concentration that is in the range 10,000 to 20,000 mg/L; and the third section is configured to channel desulfurization absorption liquid having a chloride ion concentration that is no less than 20,000 mg/L.

The support may have an annular cross-section. The plate may be disposed interior the cross-section.

The support may include a cylinder. The plate may be disposed interior the cylinder.

The support and the plate may be similar in shape; and one of the support and the plate may be surrounded by the other of the support and the plate. For example, the support in part or whole may have a horizontal cross-section, and the plate in part or whole may have a horizontal cross-section of the same shape. The shape may be a circle, a polygon (e.g., having 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 or more vertices) or any other suitable shape.

For example, the support in part or whole may have a vertical cross-section, and the plate in part or whole may have a vertical cross-section of the same shape. The shape may be a triangle, a polygon (e.g., having 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 or more vertices) or any other suitable shape.

The support may have a thickness of about 2 mm to about 20 mm.

The support may have a thickness of about 2 mm.
The support may have a thickness of about 4 mm.
The support may have a thickness of 6 mm.
The support may have a thickness of about 9 mm.
The support may have a thickness of about 12 mm.
The support may have a thickness of about 15 mm.
The support may have a thickness of about 20 mm.

Table 2 shows illustrative support thickness ranges.

TABLE 2

Illustrative support thicknesses and ranges.
Thickness, limits inclusive, mm (lower limit only where no upper limit is given)

| Illustrative Approximate Thickness | Lower | Upper |
|---|---|---|
| 2 | 1.5 | 2.5 |
| 2.5 | 2 | 3 |
| 3 | 2.5 | 3.5 |
| 3.5 | 3 | 4 |
| 4 | 3.5 | 4.5 |
| 4.5 | 4 | 5 |
| 5 | 4.5 | 5.5 |
| 5.5 | 5 | 6 |
| 6 | 5.5 | 6.5 |
| 6.5 | 6 | 7 |
| 7 | 6.5 | 7.5 |
| 7.5 | 7 | 8 |
| 8 | 7.5 | 8.5 |
| 8.5 | 8 | 9 |
| 9 | 8.5 | 9.5 |
| 9.5 | 9 | 10 |
| 10 | 9.5 | 10.5 |
| 10.5 | 10 | 11 |
| 11 | 10.5 | 11.5 |
| 11.5 | 11 | 12 |
| 12 | 11.5 | 12.5 |
| 12.5 | 12 | 13 |
| 13 | 12.5 | 13.5 |
| 13.5 | 13 | 14 |
| 14 | 13.5 | 14.5 |
| 14.5 | 14 | 15 |
| 15 | 14.5 | 15.5 |
| 15.5 | 15 | 16 |
| 16 | 15.5 | 16.5 |
| 16.5 | 16 | 17 |
| 17 | 16.5 | 17.5 |
| 17.5 | 17 | 18 |
| 18 | 17.5 | 18.5 |
| 18.5 | 18 | 19 |
| 19 | 18.5 | 19.5 |
| 19.5 | 19 | 20 |
| 20 | 19.5 | — |

The support may include a frame. The frame may circumferentially surround the plate.

The frame may include one or more vertical support columns. Two or more of the support columns may be spaced apart from each other by a spacing interval of not less than 0.5 m. The spacing may be a horizontal spacing.

A first of the columns may be connected to a second of the columns by a welded joint.

A first of the columns may be connected to a second of the columns by a bolt.

One or more of the support columns may have an H-shaped cross section.

The spacing interval may be in the range 1 m to 2 m.

Two or more beams may connect a first of the support columns to a second of the support columns. The first and second columns may be adjacent columns. A first of the beams may be at a first elevation. A second of the beams may be at a second elevation. The first elevation may be greater than the second elevation.

The plate may have a first height. The plate may include a plurality of steel plates connected together to form an interior layer of a tower. The frame may have a second height. The second height may be 95% to 105% the first height.

The stainless steel plate may include a cylinder that forms an upright layer defining an interior of a flue gas desulfurization tower. The plate may include a bottom face. The bottom face may include a bottom surface of the interior. The plate may include a top face that forms a top surface of the interior. The top surface may include a shoulder adjacent a passageway that leads out of the tower.

The apparatus may include one or more conduits. One or more, or all, of the conduits may traverse the plate. One or more, or all, of the conduits may traverse the support structure. One or more, or all, of the conduits may traverse the plate and the support structure.

One or more of the conduits may include a flue gas inlet configured to guide flue gas into a space defined by the stainless steel plate. One or more of the conduits may include a flue gas outlet configured to guide cleaned flue gas out of the space. One or more of the conduits may include a desulfurization absorption liquid inlet configured to guide desulfurization absorption liquid into the space. One or more of the conduits may include a desulfurization absorption liquid outlet configured to guide used desulfurization absorption liquid out of the space. One or more of the conduits may include a process water inlet configured to guide process water into the space.

Methods for constructing a desulfurization reactor for cleaning a flue gas are provided. The methods may include selecting, based on a pressure of the flue gas, a sulfur dioxide concentration of the flue gas, and a chloride ion concentration of the flue gas, two or more stainless steel grades. The methods may include assembling on a desulfurization tower base a first reactor section that includes a first of the stainless steel grades. The methods may include placing contiguous with the first reactor section a second reactor section that includes a second of the stainless steel grades.

The methods may include:
assembling a carbon steel support outside the reactor; and
fixing the first and second reactor sections to the carbon steel support.

Methods for cleaning flue gas are provided. The methods may include introducing flue gas into an interior region defined by a stainless steel plate interior layer of a desulfurization absorption tower. The methods may include:
flowing the flue gas up through the tower;
receiving in the interior, through the interior layer, a desulfurization absorption liquid;
transferring chloride ion from the flue gas to the desulfurization absorption liquid;
contacting the chloride ion with the interior layer; and
guiding the chloride ion out of the interior layer, in a desulfurization absorption liquid with a predetermined content of ammonium sulfate, to an ammonium sulfate aftertreatment system.

The contacting may include a first contacting of the absorption liquid with the interior layer at a first location, where steel plate includes steel of a first grade; and, then, a second contacting of absorption liquid with the interior layer at a second location, where the steel plate includes steel of a second grade. The absorption liquid in the first location may have a first chloride ion concentration. The absorption liquid in the second location may have a second chloride ion concentration. The first grade may be preselected for the first concentration. The second grade may be preselected for the second concentration.

The apparatus and methods may operate stably in a long-term continuous operation, have a longer service life, and have a relatively low investment cost and a relatively short construction cycle.

The methods may be efficient, and may remove part of the nitrogen oxides in the flue gas. Absorption liquid, such as an ammonia solution or aqueous ammonia, may be provided or supplemented, for example, in a circulation pipeline or an oxidation tank.

By selecting an appropriate stainless steel material, the construction cost of the desulfurization absorption tower may be minimized without compromising performance.

The supporting layer may be inexpensive and firm, and may require only a reduced thickness, and therefore less expensive, anti-corrosion layer, and thus reduce the construction cost of a desulfurization absorption tower.

The apparatus and methods may stably operate in a long cycle and have a low security risk may be set up relatively rapidly with a low cost.

Using the apparatus or methods, hazardous substances in the flue gas may be eliminated in an environment-friendly way.

The steps of illustrative methods may be performed in an order other than the order shown and/or described herein. Some embodiments may omit steps shown and/or described in connection with the illustrative methods. Some embodiments may include steps that are neither shown nor described in connection with the illustrative methods. Illustrative method steps may be combined. For example, one illustrative method may include steps shown in connection with another illustrative method.

Some embodiments may omit features shown and/or described in connection with the illustrative apparatus. Some embodiments may include features that are neither shown nor described in connection with the illustrative apparatus. Features of illustrative apparatus may be combined. For example, one illustrative embodiment may include features shown in connection with another illustrative embodiment.

Embodiments may involve some or all of the features of the illustrative apparatus and/or some or all of the steps of the illustrative methods.

The illustrative apparatus and methods will now be described now with reference to the accompanying drawings in the Figures, which form a part hereof. It is to be understood that other embodiments may be utilized and that structural, functional and procedural modifications may be made without departing from the scope and spirit of the present disclosure.

FIG. 1 shows illustrative desulfurization absorption tower 1, which includes a tower body and a tower chamber formed inside the tower body. The tower body is provided with lower flue gas inlet 7 and upper flue gas outlet 10 for guiding flue gas, upper circulating liquid inlet 6 and lower circulating liquid outlet 8 for guiding desulfurization absorption liquid, and process water inlet 9 for supplementing process water.

Tower 1 is constructed as a basically cylindrical tower. Flue gas outlet 10 (shown in part) is constructed as a slender neck.

The tower body includes an internal anti-corrosion layer. The anti-corrosion layer is used for contacting the flue gas and the desulfurization absorption liquid, defines the tower chamber, and is made of a stainless steel plate whose thickness is 1.0 mm to 6.0 mm. The tower body includes an external supporting layer that is used for supporting the anti-corrosion layer and is made of carbon steel. The supporting layer and the anti-corrosion layer are designed to jointly bear the load of the anti-corrosion layer. The supporting layer is designed to bear a large part of the load, for example 70% or more, and the anti-corrosion layer is designed to bear a small part of the load, for example, 30% or less.

Table 3 shows illustrative values of load distribution between the supporting layer and the anti-corrosion layer.

TABLE 3

Illustrative values of load distribution between the supporting layer and the anti-corrosion layer.
Illustrative load distribution, % of total

| Supporting layer (minimum) | Anti-corrosion layer (maximum) |
|---|---|
| 70 | 30 |
| 75 | 25 |
| 80 | 20 |
| 85 | 15 |
| 90 | 10 |
| 95 | 5 |
| 99 | 1 |

The desulfurization absorption tower may be a direct exhaust-type straight desulfurization absorption tower with a chimney, which, for example, has a height of 60 to 120 m, especially 70 to 100 m, for example, a height of 80 m or 90 m; or may be a side exhaust-type desulfurization absorption tower without a chimney, which, for example, has a height of 20 to 80 m, especially 30 to 50 m, for example, a height of 40 m or 60 m.

The diameter of the desulfurization absorption tower may be 1 m or several meters, and may be below 30 m, for example, 5 m, 10 m, 15 m, 20 m or 25 m. The diameter and the height of the desulfurization absorption tower may be selected according to parameters of flue gas to be treated.

The anti-corrosion layer includes bottom plate 2, cylinder 4 and top plate 3. The anti-corrosion layer, for example, may be composed of stainless steel plate whose thickness is 2 mm. Cylinder 4 may be made up of multiple stainless steel plates. Bottom plate 2 may include stainless steel plate that is monolithic with, attached to, or separated apart from cylinder 4. Top plate 3 may be include stainless steel plate that is monolithic with, attached to, or separated apart from cylinder 4. The stainless steel plates may be connected to each other in a sealing way, and particularly, may be welded together.

In FIG. 1, the supporting layer is made up of supporting columns 5. Columns 5 may be evenly distributed around the anti-corrosion layer along a circumferential direction. The supporting columns 5 may form a supporting frame. The anti-corrosion layer formed by stainless steel plates welded together is fixed and supported in the supporting frame, and may be, in whole or in part, supported on the supporting columns 5.

Figure 2:
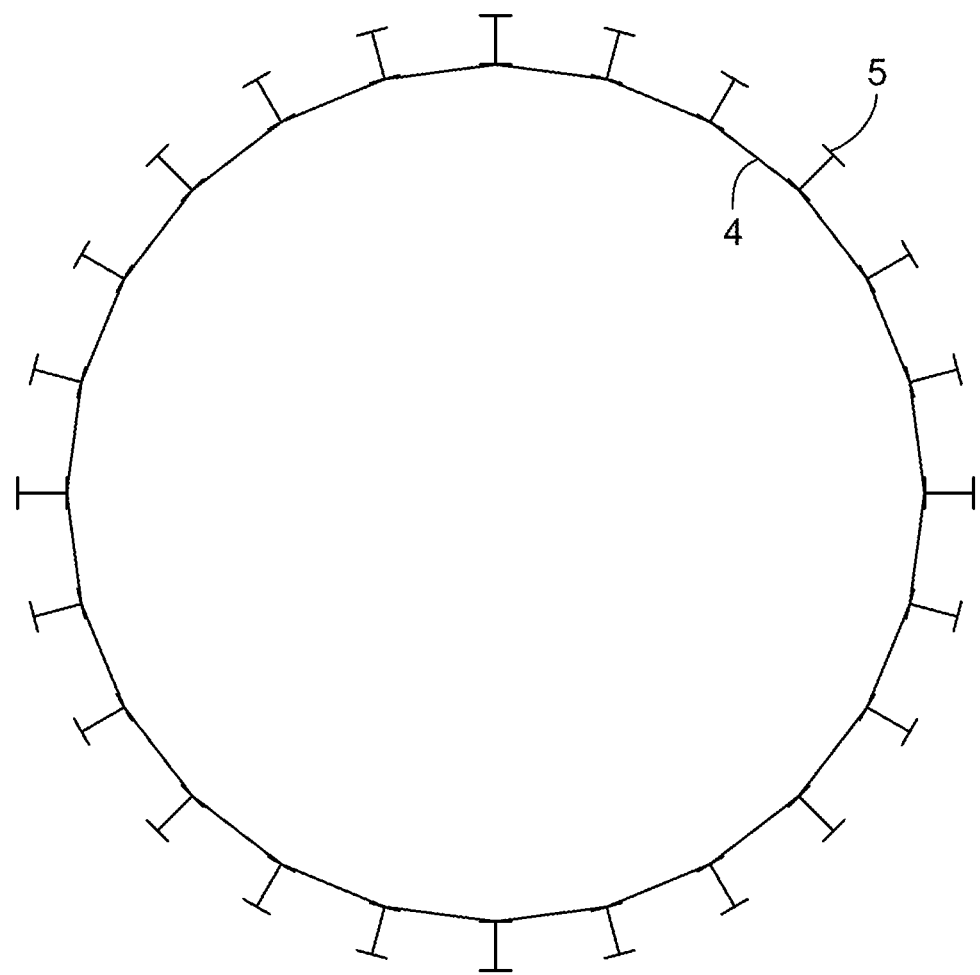
FIG. 2 is a schematic top view of an embodiment of a desulfurization absorption tower in accordance with the principles of the invention, wherein a supporting layer is constructed as a supporting frame.

FIG. 2 shows illustratively 24 supporting columns 5 that are evenly distributed along a circumferential direction around cylinder 4 of an anti-corrosion layer. In the circumferential direction of the desulfurization absorption tower, the supporting columns 5 are connected to each other, especially welded and/or connected by bolts. Multiple beams may be disposed at different heights between adjacent supporting columns, and the beams may connect the adjacent supporting columns to each other. The beams may be horizontally arranged. The beams may tilt relative to the supporting columns, for example, at an angle of 15° to 75° with respect to the supporting columns. The beams and the supporting columns may be welded and/or connected to each other by bolts.

The height of the supporting column 5 may be about the same as the height of the anti-corrosion layer. The difference in heights of the supporting column and the anti-corrosion layer may be ±10 m. The difference in heights of the supporting column and the anti-corrosion layer may be ±5 m. The difference in heights of the supporting column and the anti-corrosion layer may be ±1 m.

The height of the supporting column may be 95-105% the height of the anti-corrosion layer.

Figure 3:
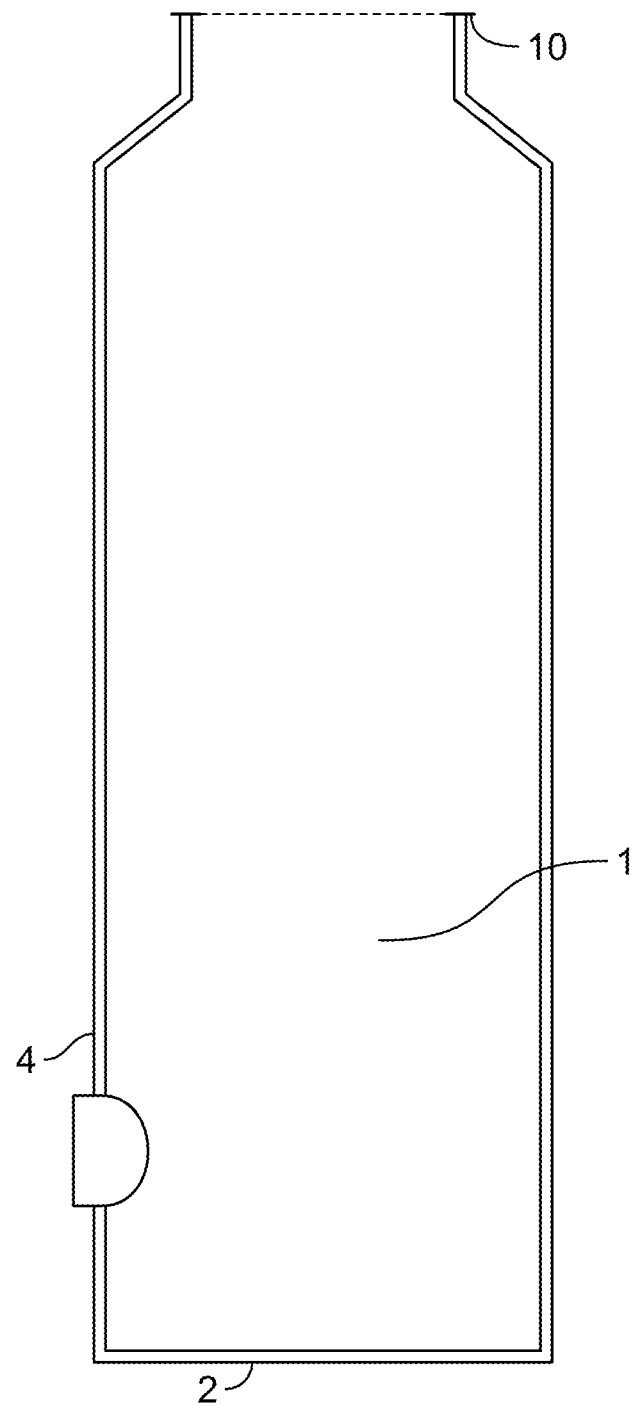
FIG. 3 is a schematic front view of an embodiment of a desulfurization absorption tower in accordance with the principles of the invention, wherein a supporting layer is constructed as an outer cylinder.

FIG. 3 shows illustratively that the supporting layer is formed by an outer cylinder. The outer cylinder is in a shape the same as that of the anti-corrosion layer, for fixing and supporting the anti-corrosion layer. For the sake of clarity, some components of tower 1 that are shown in FIG. 1 are not shown in FIG. 3.

The supporting layer may include an outer cylinder and supporting columns. In contrast to FIG. 1, the supporting columns may support the outer cylinder. The outer cylinder may support the anti-corrosion layer. The columns may thus indirectly support the anti-corrosion layer.

As mentioned above, the anti-corrosion layer is supported by the supporting layer. As a supplement, the anti-corrosion layer may also be mechanically connected to the supporting layer, and thus they are fixed together. For example, the anti-corrosion layer may be welded together with the supporting layer.

The anti-corrosion layer may include sections that have different type of support with respect to the supporting layer. For example, one or more sections of the anti-corrosion layer may be a section that is directly supported by the supporting layer. One or more sections of the anti-corrosion layer may be a section that is indirectly supported by the supporting layer. One or more sections of the anti-corrosion layer may be a section that is not supported by the supporting layer. One or more sections of the anti-corrosion layer may be a section that is not supported by the supporting layer.

Direct support may include mechanical fastening. One or more of the sections of the anti-corrosion layer may be fastened to the supporting layer by one or both of welding and fasteners. Direct support may include load bearing or stabilization by contact between the supporting layer and the anti-corrosion layer. For example, the supporting layer may include one or both of columns and beams, or any other suitable structure.

Indirect support may include support of a section by a different section that is supported by the supporting layer.

Cylinder 4 may include two or more sections along a height direction, and stainless steel materials of the sections may be selected according to an expected chloride ion concentration of the desulfurization absorption liquid during operation of the desulfurization absorption tower. The chloride ion concentration may be approximately calculated according to parameters of flue gas by means of mathematical modeling. In addition, the chloride ion concentration may also be approximately estimated by using data collected during operation of an existing desulfurization absorption tower. For example, existing data of the existing desulfurization absorption tower of a similar size for treating similar flue gas can be used.

Table 4 shows illustrative parameters for which 316L stainless steel may be selected.

TABLE 4

| Illustrative parameters for which 316L stainless steel may be selected. | |
|---|---|
| Desulfurization Parameter | Value |
| Flow rate of raw flue gas | 48,000 Nm³/h |
| SO₂ concentration in raw flue gas | 4,200 mg/Nm³ |
| HCl concentration in raw flue gas | 5.3 mg/Nm³ |
| Total dust* concentration in raw flue gas | 28.4 mg/Nm³ |

TABLE 4-continued

| Illustrative parameters for which 316L stainless steel may be selected. | |
|---|---|
| Desulfurization Parameter | Value |
| SO₂ concentration in purified flue gas | 21.4 mg/Nm³ |
| Total dust concentration (containing aerosol) in purified flue gas | 2.6 mg/Nm³ |
| Amount of escaping ammonia | 1.3 mg/Nm³ |
| Recovery rate of ammonia | 99.43% |

*Dust may include particulate matter that is not removed by a particulate matter control unit (such as an electrostatic particle precipitator or baghouse).

Chloride ion concentrations of desulfurization absorption liquid that may be present in connection with a process having desulfurization parameters such as those of Table 4 may be mainly in two ranges:

(a) 13,000 to 18,000 mg/L; and
(b) 4,000 to 8,000 mg/L.

For example, a stainless steel plate with a material type of 2205 may be used for a section of cylinder 4 that is expected to contact the desulfurization liquid having a chloride ion concentration of 13,000 to 18,000 mg/L. A stainless steel plate with a material type of 316L may be used for a section of cylinder 4 that is expected to contact the desulfurization liquid having a chloride ion concentration of 4,000 to 8,000 mg/L.

Supporting columns 5 may be implemented as H-steel or steel of any other suitable cross-section. The H-steel may have a width that is, for example, 250 mm. H-steel members may be placed at intervals (between adjacent supporting columns 5) of, for example, 1.9 m.

Methods for implementing a desulfurization absorption tower are provided. The methods may include:

collecting parameters of flue gas expected to be treated, for example, the amount of the flue gas, pressure of the flue gas, a temperature of the flue gas, a sulfur dioxide concentration of the flue gas, a chloride ion concentration of the flue gas, and so on;

designing size, for example, diameter and height, of the desulfurization absorption tower according to the parameters of the flue gas;

obtaining a chloride ion concentration of the desulfurization absorption liquid along a height direction, and determining, according to the obtained chloride ion concentration, sections of the anti-corrosion layer in the height direction and stainless steel materials of the sections;

designing internal components and pipe orifices of the desulfurization absorption tower;

determining a load of the desulfurization absorption tower, and then determining a load distribution proportion between the anti-corrosion layer and the supporting layer, selecting a scheme (an outer cylinder or a supporting frame) of the supporting layer, and calculating the thickness of the anti-corrosion layer; and constructing a base of the desulfurization absorption tower, constructing the anti-corrosion layer of the desulfurization absorption tower, and constructing the supporting layer of the desulfurization absorption tower, wherein the construction of the anti-corrosion layer and the incremental construction of the supporting layer are carried out alternately.

Methods for operating a desulfurization absorption tower are provided. The methods may include receiving raw flue gas in the tower chamber from lower flue gas inlet 7 of the desulfurization absorption tower. The flue gas may flow from bottom to top. The flue gas may be cooled, washed and desulfurized by the desulfurization absorption liquid, which may be sprayed via circulating liquid inlet 6. Fine particles may be removed from the flue gas. The flue gas may be demisted before arriving at the flue gas outlet 10. Then, purified flue gas that is desulfurized to a great extent may be discharged from the flue gas outlet 10 at the top of the tower. Flue gas outlet 10 may be constructed as a direct exhaust chimney.

The desulfurization absorption liquid may flow back, via circulating liquid outlet 8, to a corresponding circulation tank and a corresponding oxidation tank. Process water may be continuously supplemented at process water inlet 9. Absorption solution may be supplemented to circulation pipelines and oxidation tanks. Desulfurization absorption liquid whose ammonium sulfate concentration reaches a predetermined degree may be conveyed as a slurry to an ammonium sulfate after-treatment system via circulating liquid outlet 8. The slurry may be subjected to densification, centrifugal separation, drying and packaging to produce an ammonium sulfate product. Under some circumstances, evaporative crystallization may be applied before the densification procedure.

Table 5, below sets forth illustrative desulfurization process parameters.

TABLE 5

Illustrative parameters for which 316L stainless steel may be selected.

| Desulfurization Parameter | Value |
| --- | --- |
| Raw flue gas flow rate | 510,000 Nm$^3$/h |
| SO$_2$ concentration in raw flue gas | 2,200 mg/Nm$^3$ |
| HCl content in the raw flue gas | 7.6 mg/Nm$^3$ |
| Total dust concentration in raw flue gas | 15.3 mg/Nm$^3$. |
| SO$_2$ concentration in purified flue gas | 20.1 mg/Nm$^3$ |
| Total dust concentration (containing aerosol) in purified flue gas | 1.7 mg/Nm$^3$ |
| Amount of escaping ammonia | 0.8 mg/Nm$^3$ |
| Recovery rate of ammonia | 99.6%, |

A desulfurization absorption tower structure appropriate for the parameters set forth in Table 5 may include an internal anti-corrosion layer and an external supporting layer. The supporting layer may include 24 supporting columns 5 that form a steel supporting frame. The anti-corrosion layer may be formed by a stainless steel plate whose thickness is 4 mm, and may include a bottom plate 2, a top plate 3 and a cylinder 4. The anti-corrosion layer may be fixed and supported on the external supporting layer. The load may be mainly borne by the supporting layer. The cylinder 4 may be made up of multiple stainless steel plates. Each of the plates may have a thickness of 4 mm and a height of ⅔ m, and the stainless steel plates may be welded to each other. The supporting columns may include H steel. The width of the H steel may be 350 mm. An interval between adjacent supporting columns may be 2.5 m.

Because the stainless steel plates in the desulfurization absorption tower may have a small thickness, compared with the conventional carbon steel tower having a glass flake lining, the total construction cost of the desulfurization absorption tower may be reduced by more than 10%, and the construction timeline may be shortened by about ⅓.

In such a desulfurization absorption tower, the chloride ion concentration in the desulfurization absorption liquid may be approximately determined according to the parameters of the flue gas, and the material of the anti-corrosion layer may be selected according to an expected chloride ion concentration of the desulfurization absorption liquid.

Chloride ion concentrations of desulfurization absorption liquid that may be present in connection with a process having desulfurization parameters such as those of Table 5 may be mainly in two ranges:

(a) 23000 to 31000 mg/L; and
(b) 14000 to 17000 mg/L.

A section of the cylinder 4 may contact desulfurization absorption liquid having a chloride ion concentration of 23,000 to 31,000 mg/L may include a stainless steel plate of material type of 2507. A section of the cylinder 4 expected to contact the desulfurization absorption liquid having a chloride ion concentration of 14,000 to 17,000 mg/L may adopt a stainless steel plate of material type of 2205. Such a desulfurization absorption tower may operate for three years without requiring an overhaul.

Another desulfurization absorption tower structure appropriate for the parameters set forth in Table 5 may include a tower similar to the desulfurization absorption tower mentioned previously, but different in that the thickness of the steel plate of the anti-corrosion layer may be 3.5 mm, the supporting layer may be constructed as an outer cylinder, and the outer cylinder may be made of carbon steel whose material type is Q235 and may have a thickness of 9 mm. Compared with the conventional carbon steel tower having a glass flake lining, the total construction cost may be reduced by approximately 15%, and the construction period of the desulfurization absorption tower may be reduced by 1.5 months.

The apparatus may include a desulfurization absorption tower that may include a tower body and a tower chamber that is formed inside the tower body. The tower body may be provided with a lower flue gas inlet (7) and an upper flue gas outlet (10) for guiding flue gas, an upper circulating liquid inlet (6) and a lower circulating liquid outlet (8) for guiding desulfurization absorption liquid, and a process water inlet (9) for supplementing process water. The tower body may include an internal anti-corrosion layer that is used for contacting the flue gas and the desulfurization absorption liquid, defines the tower chamber, and may be made of a stainless steel plate whose thickness is 1.0 mm to 6.0 mm. The tower body may include an external supporting layer that is used for supporting the anti-corrosion layer and is made of carbon steel, especially carbon steel whose material type is Q235 or Q345. The supporting layer and the anti-corrosion layer may be designed to jointly bear a load, wherein the supporting layer may be designed to bear a large part of the load, and the anti-corrosion layer may be designed to bear a small part of the load.

The desulfurization absorption tower may be an ammonia-process desulfurization absorption tower, wherein the process water is production make-up water.

The thickness of the stainless steel plate may be 2.0 mm, 2.5 mm, 3.0 mm, 3.5 mm, 4.0 mm, 4.5 mm or 5.0 mm.

The anti-corrosion layer may be formed by multiple stainless steel plates connected together.

The anti-corrosion layer may include a bottom plate (2), a cylinder (4), and a top plate (3). The cylinder may be made up of two or more sections along a height direction, and stainless steel materials of the sections may be selected to correspond to an expected chloride ion concentration of the desulfurization absorption liquid during operation of the desulfurization absorption tower.

The stainless steel material of the anti-corrosion layer may be selected from stainless steel of the following material types: 316L, 2205, 2605N and 2507, and the stainless steel material may be selected to correspond to an expected chloride ion concentration of the desulfurization absorption liquid during operation of the desulfurization absorption tower, wherein 316L is selected when the chloride ion concentration of the desulfurization absorption liquid is less than 10000 mg/L, 2205 or 2605N is selected when the chloride ion concentration of the desulfurization absorption liquid is 10000 to 20000 mg/L, and 2507 is selected when the chloride ion concentration of the desulfurization absorption liquid is 20000 mg/L or more.

The supporting layer may be an outer cylinder and/or a supporting frame. The outer cylinder and the anti-corrosion layer may have the same shape, and may have a thickness of 2 to 20 mm, for example, 4 mm, 6 mm, 9 mm, 12 mm or 15 mm.

The supporting frame may be made up of multiple supporting columns (5) that are distributed, possibly evenly distributed, in a circumferential direction. The supporting columns may have an interval of not less than 0.5 m, an interval of 1 to 2 m, or more. The supporting column may be made of H-steel.

In the circumferential direction of the desulfurization absorption tower, the supporting columns (5) may be connected to each other, for example, by welds and/or bolts. Multiple beams may be disposed at different heights between adjacent supporting columns (5), and the beams may connect the adjacent supporting columns to each other. The height of the supporting column (5) may be 95-105% of the height of the anti-corrosion layer.

The methods may include setting up the desulfurization absorption tower. The methods may include:

predetermining parameters of flue gas treated during operation of the desulfurization absorption tower, the parameters including: the amount of the flue gas, pressure of the flue gas, a sulfur dioxide concentration of the flue gas, and a chloride ion concentration of the flue gas;

obtaining, according to the parameters of the flue gas, an expected chloride ion concentration of the desulfurization absorption liquid during operation of the desulfurization absorption tower;

determining, according to the parameters of the flue gas, the size of the tower chamber of the desulfurization absorption tower, and determining sizes and positions of the flue gas inlet, the flue gas outlet, the circulating liquid inlet, the circulating liquid outlet, and the process water inlet;

determining, according to the expected chloride ion concentration of the desulfurization absorption liquid, sections of the anti-corrosion layer of the desulfurization absorption tower and stainless steel materials of the sections;

determining, according to the parameters of the flue gas, a load of the desulfurization absorption tower, then determining load distribution between the anti-corrosion layer and the supporting layer, and then determining the thickness of the anti-corrosion layer and the size of the supporting layer;

setting up a base of the desulfurization absorption tower according to the total weight of the desulfurization absorption tower; and setting up the anti-corrosion layer and the supporting layer on the base of the desulfurization absorption tower according to determined sizes and materials of the anti-corrosion layer and the supporting layer.

The process of setting up the anti-corrosion layer and the process of setting up the supporting layer may be carried out alternately.

The methods may include operating the desulfurization absorption tower. The methods may include:

introducing raw flue gas into the tower chamber of the desulfurization absorption tower via the flue gas inlet, wherein the flue gas flows from bottom to top in the tower chamber, and exhausting purified flue gas out of the desulfurization absorption tower via the flue gas outlet; and spraying the desulfurization absorption liquid from top to bottom in the tower chamber via the circulating liquid inlet, wherein the flue gas is cooled, washed and desulfurized, and fine particles are removed from the flue gas.

Before the flue gas leaves the tower chamber via the flue gas outlet, the flue gas may be demisted.

The methods may include:

supplementing process water via the process water inlet; and guiding the desulfurization absorption liquid with a predetermined content of ammonium sulfate to an ammonium sulfate after-treatment system via the circulating liquid outlet.

The features disclosed in the present application can be combined with each other arbitrarily, as long as such combinations are not self-contradictory. All the combinations are contents disclosed in the present application.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

While this invention may be embodied in many different forms, there are described in detail herein specific embodiments of the invention. The present disclosure illustrates principles of the invention, and is not intended to limit the invention to the particular embodiments illustrated. All patents, patent applications, scientific papers, and any other referenced materials mentioned herein are incorporated by reference in their entireties. The principles of the invention encompass any possible combination of some or all of the various embodiments mentioned herein, described herein and/or incorporated herein. The principles of the invention encompass any possible combination that also specifically excludes any one or some of the various embodiments mentioned herein, described herein and/or incorporated herein.

Thus, apparatus and methods for flue-gas desulfurization have been provided. Persons skilled in the art will appreciate that the present invention can be practiced by other than the described embodiments, which are presented for purposes of illustration rather than of limitation. The present invention is limited only by the claims that follow.

What is claimed is:
1. A method for cleaning flue gas, the method comprising:
   introducing flue gas into an interior region defined by a stainless steel plate interior layer of a desulfurization absorption tower;
   flowing the flue gas up through the tower;
   receiving in the interior, through the interior layer, a desulfurization absorption liquid;
   transferring chloride ion from the flue gas to the desulfurization absorption liquid;
   contacting the chloride ion with the interior layer; and guiding the chloride ion out of the interior layer, in a desulfurization absorption liquid with a predetermined content of ammonium sulfate, to an ammonium sulfate after-treatment system.

2. The method of claim 1 wherein the contacting comprises:
   contacting the absorption liquid with the interior layer at a first location, where steel plate includes steel of a first grade; and, then,
   contacting the absorption liquid with the interior layer at a second location, where the steel plate includes steel of a second grade;
   wherein:
     the absorption liquid in the first contacting has a first chloride ion concentration;
     the absorption liquid in the second contacting has a second chloride ion concentration;
     the first grade is preselected for the first concentration; and
     the second grade is preselected for the second concentration.

3. The method of claim 2 wherein the grades are preselected corresponds to:
   pre-setting anti-corrosion properties of the interior layer; and
   defining a flue gas guide path.

4. The method of claim 2 wherein the steel plate has a thickness in the range 1.0 mm to 6.0 mm.

5. The method of claim 2 wherein the steel plate includes:
   a cylinder that forms an upright layer of the interior layer;
   a bottom face that forms a bottom surface of the interior layer; and
   a top face that forms a top surface of the interior layer.

6. The method of claim 2 wherein the first grade is preselected includes the first grade including:
   316L stainless steel, corresponding to the first chloride ion concentration being less than 10,000 mg/L;
   2205 stainless steel or 2605N stainless steel, corresponding to the first chloride ion concentration being in the range 10,000 mg/L to 20,000 mg/L; and
   2507 stainless steel, corresponding to the first chloride ion concentration being no less than 20,000 mg/L.

7. The method of claim 2 wherein the second grade is preselected includes the second grade: including:
   316L stainless steel, corresponding to the second chloride ion concentration being less than 10,000 mg/L;
   2205 stainless steel or 2605N stainless steel, corresponding to the second chloride ion concentration being in the range 10,000 mg/L to 20,000 mg/L; and
   2507 stainless steel, corresponding to the second chloride ion concentration being no less than 20,000 mg/L.

8. The method of claim 2 wherein a plurality of plates of the first grade and of the second grade are connected together to form at least part of the interior layer.

9. The method of claim 8 wherein the plurality of plates of the:
   first grade are connected together to form a first section of the interior layer; and
   second grade are connected together to form a second section of the interior layer.

10. The method of claim 2 wherein the introducing, the receiving and the guiding are performed via a plurality of conduits, each traversing the steel plate, the plurality of conduits including:
    a flue gas inlet through which the flue gas is introduced into the interior;
    a desulfurization absorption liquid inlet through which desulfurization absorption liquid is received in the interior; and
    a desulfurization absorption liquid outlet through which used desulfurization absorption liquid is guided out of the interior layer.

11. The method of claim 10 wherein the plurality of conduits further includes:
    a flue gas outlet through which cleaned flue gas is exited out of the interior; and
    a process water inlet through which water is entered into the interior.

12. The method of claim 10 further comprising:
    predetermining, based on parameters of the flue gas:
      a size of the interior; and
      sizes and positions of:
        the flue gas inlet;
        a flue gas outlet;
        a circulating liquid inlet;
        a circulating liquid outlet; and
        a process water inlet.

13. The method of claim 2 wherein the contacting further comprises:
    contacting the absorption liquid with the interior layer at a third location, where the steel plate includes steel of a third grade;
    wherein:
      the absorption liquid in the third contacting has a third chloride ion concentration; and
      the third grade is preselected for the third concentration.

14. The method of claim 13 wherein the third grade is preselected includes the third grade including:
    316L stainless steel, corresponding to the third chloride ion concentration being less than 10,000 mg/L;
    2205 stainless steel or 2605N stainless steel, corresponding to the third chloride ion concentration being in the range 10,000 mg/L, to 20,000 mg/L; and
    2507 stainless steel, corresponding to the third chloride ion concentration being no less than 20,000 mg/L.

15. The method of claim 13 wherein:
    the first grade includes 316L stainless steel;
    the second grade includes 2205 stainless steel or 2605N stainless steel; and
    the third grade includes 2507 stainless steel.

16. The method of claim 13 wherein a plurality of plates of the first grade, of the second grade and of the third grade are connected together to form at least part of the interior layer.

17. The method of claim 16 wherein the plurality of plates of:
    first grade are connected together to form a first section of the interior layer;
    second grade are connected together to form a second section of the interior layer; and
    third grade are connected together to form a third section of the interior layer.

18. A method for cleaning flue gas, the method comprising:
    introducing flue gas into an interior region defined by a stainless steel plate interior layer of a desulfurization absorption tower;
    flowing the flue gas up through the tower;
    receiving in the interior, through the interior layer, a desulfurization absorption liquid;
    transferring chloride ion from the flue gas to the desulfurization absorption liquid;

contacting the chloride ion with the interior layer; and guiding the chloride ion out of the interior layer, in a desulfurization absorption liquid with a predetermined content of ammonium sulfate.

19. The method of claim 18 wherein the contacting comprises:

contacting the absorption liquid with the interior layer at a first location, where steel plate includes steel of a first grade; and, then, contacting the absorption liquid with the interior layer at a second location, where the steel plate includes steel of a second grade;

wherein:

the absorption liquid in the first contacting has a first chloride ion concentration;

the absorption liquid in the second contacting has a second chloride ion concentration;

the first grade is preselected for the first concentration; and the second grade is preselected for the second concentration.

20. The method of claim 19 wherein the grades are preselected corresponds to:

pre-setting anti-corrosion properties of the interior layer; and defining a flue gas guide path.

21. The method of claim 19 wherein the steel plate has a thickness in the range 1.0 mm to 6.0 mm.

22. The method of claim 19 wherein the first grade is preselected includes the first grade including:

316L stainless steel, corresponding to the first chloride ion concentration being less than 10,000 mg/L;

2205 stainless steel or 2605N stainless steel, corresponding to the first chloride ion concentration being in the range 10,000 mg/L to 20,000 mg/L; and 2507 stainless steel, corresponding to the first chloride ion concentration being no less than 20,000 mg/L.

23. The method of claim 19 wherein the second grade is preselected includes the second grade: including:

316L stainless steel, corresponding to the second chloride ion concentration being less than 10,000 mg/L;

2205 stainless steel or 2605N stainless steel, corresponding to the second chloride ion concentration being in the range 10,000 mg/L to 20,000 mg/L; and 2507 stainless steel, corresponding to the second chloride ion concentration being no less than 20,000 mg/L.

24. The method of claim 19 wherein the introducing, the receiving and the guiding are performed via a plurality of conduits, each traversing the steel plate, the plurality of conduits including:

a flue gas inlet through which the flue gas is introduced into the interior;

a desulfurization absorption liquid inlet through which desulfurization absorption liquid is received in the interior; and a desulfurization absorption liquid outlet through which used desulfurization absorption liquid is guided out of the interior layer.

25. The method of claim 24 further comprising:

predetermining, based on parameters of the flue gas:

a size of the interior; and sizes and positions of:

the flue gas inlet;

a flue gas outlet;

a circulating liquid inlet;

a circulating liquid outlet; and a process water inlet.

26. The method of claim 24 wherein the plurality of conduits further includes:

a flue gas outlet through which cleaned flue gas is exited out of the interior; and a process water inlet through which water is entered into the interior.

27. The method of claim 26 further including:

supplementing process water via the process water inlet; and guiding the desulfurization absorption liquid with the predetermined content of ammonium sulfate to an ammonium sulfate after-treatment system via a circulating liquid outlet.

28. The method of claim 19 wherein the contacting further comprises:

contacting the absorption liquid with the interior layer at a third location, where the steel plate includes steel of a third grade;

wherein:

the absorption liquid in the third contacting has a third chloride ion concentration; and the third grade is preselected for the third concentration.

29. The method of claim 28 wherein the third grade is preselected includes the third grade including:

316L stainless steel, corresponding to the third chloride ion concentration being less than 10,000 mg/L;

2205 stainless steel or 2605N stainless steel, corresponding to the third chloride ion concentration being in the range 10,000 mg/L to 20,000 mg/L; and 2507 stainless steel, corresponding to the third chloride ion concentration being no less than 20,000 mg/L.

30. The method of claim 28 wherein:

the first grade includes 316L stainless steel;

the second grade includes 2205 stainless steel or 2605N stainless steel; and the third grade includes 2507 stainless steel.

\* \* \* \* \*